United States Patent Office 3,184,378

Patented May 18, 1965

3,184,378
INSECTICIDES

Robert M. Cole, Bryn Athyn, Pa., assignor to Lee Nusbaum, Philadelphia, Pa.

No Drawing. Filed Jan. 26, 1954, Ser. No. 406,348
2 Claims. (Cl. 167—24)

This invention relates to insecticides and is particularly concerned with atmospheric dispersions of non-volatile insecticides.

Pyrethrum and related insecticides are maximally effective when dispersed in the air. Since these materials are practically non-volatile at ordinary temperatures, dispersion has been effected by mixing them with volatile liquids, which when volatilized, create aerosols. This technique is of great value in establishing a temporary high concentration of insecticide in the air, but the dispersion or aerosol begins to dissipate and oxidize immediately after the material has been released. Should the space to be treated again become infested, it is necessary to repeat the process.

The present invention is concerned with novel compositions and methods which make it possible to maintain an effective concentration of a non-volatile insecticide in the air in a confined space over a long period of time.

According to the invention, a non-volatile insecticide is mixed with a solid material which has a high vapor-pressure at room temperature. I have discovered that, as the high vapor-pressure material sublimes, it carries the low vapor-pressure material into the air with it.

While various kinds of insecticides and various kinds of high vapor-pressure carrier materials may be employed, it is desirable in some cases to employ as a carrier material a substance which has insecticidal properties itself, and preferably one which attacks a stage of the insect life cycle not affected by the non-volatile component. For example, pyrethrins, which are effective against flying insects, may be employed with a carrier component comprising para-di-chloro-benzene, which is effective against larvae and eggs. This combination is particularly appropriate for use against moths.

Material which can be used include, as non-volatile components, the pyrethrins, allethrin, and related compounds, and, as, carrier materials, para-di-chloro-benzene, camphor and naphthalene.

Allethrin is available in relatively pure form, and, as such, does not sublime. It is, moreover, sensitive to oxidation.

Commercial pyrethrum is a solution in a petroleum solvent of pyrethrins, the active insecticidal substances of the pyrethrum flower.

The solvent employed is a deodorized petroleum fraction known in the trade as Deo-base. Pyrethrum extracts are further identified according to the concentration of pyrethrins therein, for example, 20% pyrethrum is a mixture comprising 20% pyrethrins and 80% Deo-base.

Pyrethrins in the form of commercial pyrethrum are not volatile. Thus, when 20% extract is exposed to the air, it loses 80% of its weight in about 100 hours, after which the weight remains constant over a long period of time. The residue which remains is a gummy substance comprising practically all of the original pyrethrins, thus indicating that it is only the Deo-base which evaporates.

I have discovered, however, that when either a commercial pyrethrum extract or pure allethrin is mixed with a relatively large amount of a subliming substance, the entire mixture will sublime at a rate which approximates that at which the subliming material alone sublimes under the same conditions.

If the concentration of the non-volatile ingredient in the mixture is increased progressively, a critical concentration is reached; and mixtures containing more than this critical amount of non-volatile insecticide will leave behind on sublimation a residue consisting chiefly of non-volatile constituents. I have further discovered that there is a critical concentration for each combination of volatile and non-volatile ingredients.

Examples of different combinations and different concentrations follow herebelow:

*Example I*

1/10 of 1% pyrethrum (20% extract) was mixed with para-di-chloro-benzene and allowed to stand on a 5" square of white broadcloth. When the para-di-chloro-benzene had completely disappeared, there remained tiny concentrated dirt spots of solid carbonaceous material which were deposited on the extenuated fibres standing off from the surface of the piece of cloth. A slight stain marked the spot where each of these dirt particles was concentrated.

The stain was a reddish-brown color at first, but after standing for 24 hours, the color turned to greenish. After another 48 hours, this color had almost disappeared, but the stained spot could still be discerned. After a week, the stain had disappeared almost completely. The dirt particles remained.

*Example II*

The experiment of Example I was repeated with 1/15 of 1% pyrethrum (20% extract). The results were substantially the same, although the staining was initially less extensive and disappeared within 72 hours.

*Example III*

The experiment of Example I was repeated with 1/20 of 1% pyrethrum (20% extract). When the para-di-chloro-benzene had completely disappeared, the cloth was entirely free of stain and the only trace of the original material was a very few small dirt spots adhering to the cloth so loosely that they were easily brushed off.

The above experiments established that the critical concentration of pyrethrins in para-di-chloro-benzene is .01%. That is, as much as .01% pyrethrins calculated on the total weight of the mixture can be sublimated by para-di-chloro-benzene.

The result of similar experiments with other combinations are tabulated herebelow:

| Non-volatile Ingredients | Volatile Ingredients | Critical Concentration, percent |
|---|---|---|
| Pyrethrins as Pyrethrum (20% extract). | Camphor | .02 |
| Allethrin | Para-di-chloro-benzene | .03 |

It will be understood that the critical concentrations above set forth establish upper limits on the percentage of non-volatile ingredients which may be employed in mixtures intended for specific applications, but that higher concentrations may be used for other purposes.

For example, when the material is to be placed in direct contact with clothing or other material to be protected, i.e., by sprinkling the mixture in a trunk or similar container, the concentration should be kept below the critical amount in order to avoid staining the fabric.

On the other hand, the mixture may be packed in a container having an opening of appropriate size and the entire package placed in a closet or other storage space. For such applications, the concentration of non-volatile ingredients may be greater than the critical amount, since any residue will remain in the package.

However, I have found that mixtures containing the critical amount of non-volatile insecticides or less are entirely effective for ordinary purposes, including the treatment of enclosed spaces by sublimation from a package as described above.

Indeed, the concentrations established by this method are of the same order as those established temporarily through the use of aerosols.

For example, a typical aerosol bomb contains .4% pyrethrins. A seven second spray from such a bomb vaporizes a total of 3.5 grams of material and effectively treats 1,000 cu. ft. of space. An effective concentration of pyrethrins is thus .000014 gram per cu. ft.

One pound of a mixture of para-di-chloro-benzene and 1/20 of 1% pyrethrum (20% extract) contains .0453 gram of pyrethrins. One pound of the mixture, when packaged to sublime completely in 60 days, will therefore release an average of .00075 gram of pyrethrins each day. This amounts to .000015 gram per cu. ft. in a storage space having a volume of 50 cu. ft.

Pyrethrins, like allethrin, are very sensitive to oxidation and when exposed to the air either in the form of extract or in aerosols are quickly oxidized and rendered useless. I have found however that the vapor of the volatile constituent in mixtures prepared in accordance with the invention blankets the non-volatile constituent and protects it from oxidation, at least until it is volatilized. Since the volatilized material is continuously replaced by newly sublimed material, the air in the space being treated is always supplied with fresh unoxidized material in an amount sufficient to kill all flying insects.

The material prepared in accordance with the invention may be used in a plurality of ways. As above mentioned, the mixture may be manually scattered over the garments or other objects to be protected; an opened package of material may be placed in a confined space such as a closet or storage room; or the material may be blown into the space and/or onto the garments by an air stream generated in a vacuum cleaner, as is well known in the art.

I claim:

1. A solid insecticide comprising essentially in admixture a first ingredient comprising a 20% mixture of a pyrethrin and petroleum solvent and a second ingredient comprising crystalline para-di-chloro-benzene, the first ingredient comprising from .01% to .02% of the total.

2. A solid insecticide having the composition: .5 gram of a 20% pyrethrum, 80% petroleum solvent mixture; para-di-chloro-benzene to make up 500 grams.

References Cited by the Examiner

UNITED STATES PATENTS

| 1,496,279 | 6/24 | Shibata | 167—32 |
| 2,376,327 | 5/45 | Chuck | 167—37 |
| 2,475,186 | 7/49 | Kamlet | 167—39 X |
| 2,789,078 | 4/57 | Trusler | 167—33 |

FOREIGN PATENTS

| 278,816 | 10/27 | Great Britain. |
| 440,536 | 1/36 | Great Britain. |
| 579,199 | 7/46 | Great Britain. |
| 619,687 | 3/49 | Great Britain. |
| 639,937 | 7/50 | Great Britain. |
| 462,159 | 2/51 | Italy. |

OTHER REFERENCES

Bourcart: Insecticides, Fungicides, and Weed Killers, 2nd ed., 1925, pages 407–410.

LEWIS GOTTS, *Primary Examiner.*

DONALD J. ARNOLD, WILLIAM B. KNIGHT, MORRIS O. WOLK, *Examiners.*